April 7, 1925.  
E. D. GILLESPIE  
METAL WHEEL  
Filed May 31, 1924

1,532,485

E. D. Gillespie,
Inventor

By Clarence A. O'Brien
Attorney

Patented Apr. 7, 1925.

1,532,485

UNITED STATES PATENT OFFICE.

EDWARD D. GILLESPIE, OF LAKE VILLAGE, ARKANSAS.

METAL WHEEL.

Application filed May 31, 1924. Serial No. 717,123.

*To all whom it may concern:*

Be it known that I, EDWARD D. GILLESPIE, a citizen of the United States, residing at Lake Village, in the county of Chicot and State of Arkansas, have invented certain new and useful Improvements in a Metal Wheel, of which the following is a specification.

This invention relates to new and useful improvements in cast metal wheels and has for its principal object to provide a simple and efficient construction for use in connection with logging wagons.

As is well known in the handling of logs, the wagon wheels are in most instances adapted to travel through mud, and the mud collects on the spokes of the ordinary wooden wheels now in use, causing the same to become exceedingly heavy and hindering the movement of the wagon in the transportation of the logs. The invention in the present instance has for one of its objects to provide a metal wheel which is of such a construction as to be of the same weight at all times when traveling through mud or on dry land and is further of such a construction as to withstand lateral strains caused by the carrying of a heavy load.

A still further object of the invention is to provide a metal wheel of the above mentioned character, wherein the same is provided with a removable bushing in the hub portion thereof in such a manner as to facilitate the ready and easy removal thereof whenever necessary.

A further object is to provide a metal wheel of the above mentioned character, which is simple in construction, inexpensive, strong and durable and furthermore adapted for the purposes for which it is designated.

Other objects and advantages of this invention will become apparent during the course of the following description.

In the accompanying drawing forming a part of this specification and in which like numerals designate like parts throughout the same:

Figure 1:
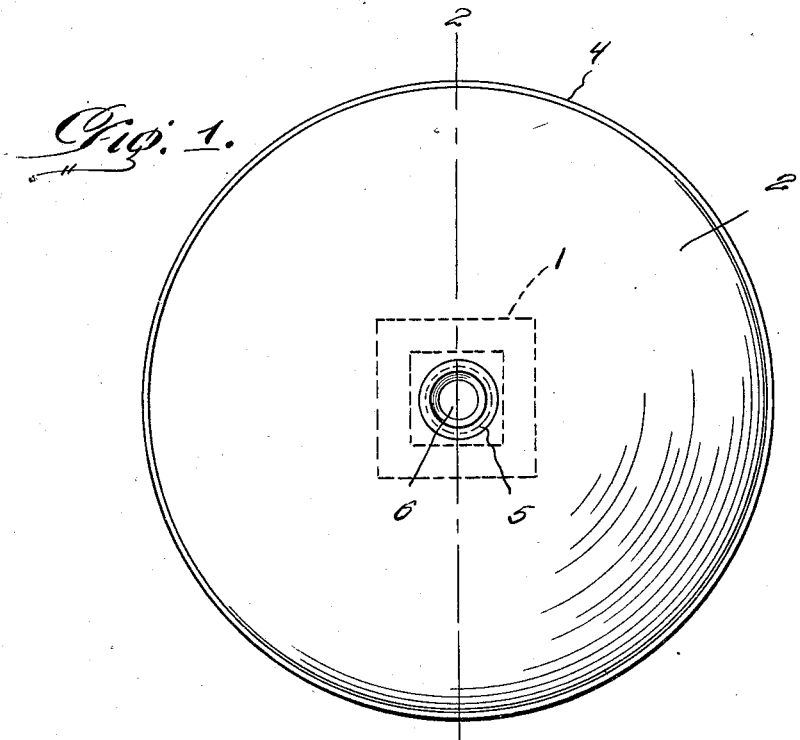
Figure 1 is a side elevation of my improved wheel.
Figure 2:
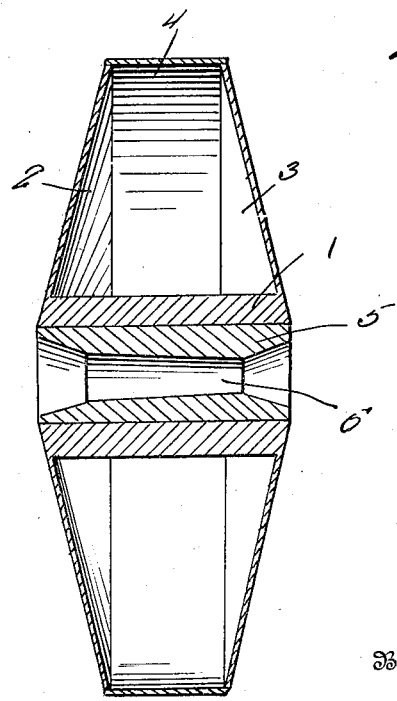
Figure 2 is a sectional view taken approximately on line 2—2 of Figure 1.

In the drawing wherein for the purpose of illustration is shown the preferred embodiment of my invention, the numeral 1 designates the hub portion of my improved cast metal wheel and the same is substantial rectangular in design as clearly illustrated in Figure 1 of the drawing. Cast integrally with the hub portion are the side sections 2 and 3 respectively and the same converge toward their outer peripheral edges in the manner clearly illustrated in Figure 2 of the drawing. Extending around the outer peripheral edges of the side sections 2 and 3 and secured thereto in any suitable manner is the metallic rim 4. The provision of the metallic rim 4 provides a hollow structure in the manner clearly illustrated in Figure 2 and it is further seen that the rim is of less width than the hub portion.

Supported within the hub portion 1 is the bushing 5, the same being also substantially rectangular in design and the purpose of which is to provide a means whereby the bushing may be readily and easily removed from the hub portion whenever necessary. The bushing 5 is provided with a longitudinally extending bore 6 which is adapted to receive the outer end of the axle (not shown) in the manner well known in the art.

The provision of a cast metal wheel of the above mentioned character, which is principally adapted to be used in connection with logging wagons will prevent the accumulation of mud thereon when the wagon travels through the mud as is usually the case. A wheel of the above mentioned character will also be water proof and air tight, making the same as light in wet weather as in dry weather.

The simplicity of my device enables the same to be manufactured at a very low cost and will further be strong and durable and further will withstand the lateral strain caused by the carrying of heavy loads.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

A cast metal wheel comprising a hub portion having an interior rectangular bore, side sections formed integral with the hub portion and converging toward their outer peripheral edges, a metal rim engaging the outer peripheral edges of the side sections, a bushing removably supported in the hub portion and being provided with a substantially rectangular outer peripheral formation, and with a longitudinally extending bore of conical formation having flared ends.

In testimony whereof I affix my signature.

E. D. GILLESPIE.